(12) United States Patent  (10) Patent No.: US 12,381,392 B2
Gao et al.  (45) Date of Patent: Aug. 5, 2025

(54) SUPPLY GUARANTEE METHOD FOR POWER DISTRIBUTION NETWORK CONSIDERING DEMAND RESPONSE AND DYNAMIC RECONFIGURATION

(71) Applicant: Sichuan University, Sichuan (CN)

(72) Inventors: Hongjun Gao, Sichuan (CN); Cheng Shi, Sichuan (CN); Renjun Wang, Sichuan (CN); Youbo Liu, Sichuan (CN); Junyong Liu, Sichuan (CN)

(73) Assignee: SICHUAN UNIVERSITY, Sichuan (CN)

( * ) Notice: Subject to any disclaimer, the term of this patent is extended or adjusted under 35 U.S.C. 154(b) by 0 days.

(21) Appl. No.: 18/983,295

(22) Filed: Dec. 16, 2024

(65) Prior Publication Data

US 2025/0219413 A1   Jul. 3, 2025

(30) Foreign Application Priority Data

Dec. 29, 2023   (CN) .......................... 202311844271.0

(51) Int. Cl.
*H02J 3/00* (2006.01)
*H02J 3/38* (2006.01)

(52) U.S. Cl.
CPC .............. *H02J 3/004* (2020.01); *H02J 3/003* (2020.01); *H02J 3/381* (2013.01);
(Continued)

(58) Field of Classification Search
CPC .. H02J 3/004; H02J 3/003; H02J 3/381; H02J 2203/20; H02J 2300/24; H02J 2300/28; H02J 2300/40
See application file for complete search history.

(56) References Cited

U.S. PATENT DOCUMENTS

2012/0130556 A1*  5/2012  Marhoefer ............. G05B 15/02
  700/291
2014/0039802 A1*  2/2014  Kanderian ............. G16B 40/00
  702/19

(Continued)

FOREIGN PATENT DOCUMENTS

CN    114362155 A    4/2022
CN    115912466 A    4/2023
CN    116231634 A    6/2023

*Primary Examiner* — Ziaul Karim
(74) *Attorney, Agent, or Firm* — Ming Jiang; OPENPTO US LLC

(57) ABSTRACT

Disclosed is a supply guarantee method for a power distribution network (PDN) considering demand response and dynamic reconfiguration, including the steps of: depicting a photovoltaic output, a wind turbine output and a load model according to meteorological factors of extreme high temperature weather, the meteorological factors including temperature and illumination, and constructing a user response model according to a user demand side response participation degree; and determining outage loss coefficients of different power consumption scenarios, constructing a PDN load reliable supply model based on the outage loss coefficients, and solving the PDN load reliable supply model to obtain a PDN supply guarantee strategy. The reliability requirement levels of different loads in PDN are classified to give priority to meeting the power demand of important loads, which can effectively guarantee the power consumption of users in the extreme high temperature weather and improve the reliability and economy of power grid operation.

5 Claims, 2 Drawing Sheets

(52) U.S. Cl.
CPC ....... *H02J 2203/20* (2020.01); *H02J 2300/24* (2020.01); *H02J 2300/28* (2020.01); *H02J 2300/40* (2020.01)

(56) References Cited

U.S. PATENT DOCUMENTS

| | | | |
|---|---|---|---|
| 2015/0054339 A1* | 2/2015 | Zhao | H02J 3/16 |
| | | | 307/24 |
| 2018/0316188 A1* | 11/2018 | Ishchenko | H02J 3/0012 |
| 2019/0027960 A1* | 1/2019 | Agrawal | H02J 3/388 |
| 2020/0153273 A1* | 5/2020 | Sun | H02J 3/0012 |
| 2021/0157312 A1* | 5/2021 | Cella | G01M 13/045 |
| 2021/0296897 A1 | 9/2021 | Cruickshank, III | |
| 2022/0108262 A1* | 4/2022 | Cella | G05B 17/02 |

\* cited by examiner

SUPPLY GUARANTEE METHOD FOR POWER DISTRIBUTION NETWORK CONSIDERING DEMAND RESPONSE AND DYNAMIC RECONFIGURATION

CROSS-REFERENCE TO RELATED APPLICATION

This application claims priority of Chinese Patent Application No. 202311844271.0, filed on Dec. 29, 2023, the entire contents of which are incorporated herein by reference.

TECHNICAL FIELD

The present disclosure relates to the technical field of power supply guarantee of power distribution networks (PDNs), in particular to a supply guarantee method for a PDN considering demand response and dynamic reconfiguration.

BACKGROUND

Through statistical summary, it is found that the extreme high temperature weather undergoes an increasing general trend in frequency, while the extreme low temperature weather is on a decreased general trend. The extreme high temperature and windless weather will greatly affect output levels of photovoltaic and wind turbine, even resulting in shutdown. At the same time, the demand for power consumption is obviously higher, reflected by such as the cooling cost. Because the power consumption of industry, commerce and residents is significantly affected by the environmental temperature, the increasing extreme hot days will greatly increase the power consumption of the urban PDN, and the imbalance between electricity supply and demand will affect the stable operation of PDN, resulting in huge operation costs of power grids.

Switch reconfiguration, as one of the measures to optimize the operation of PDN, can change the network topology by operating switches, thus improving the power supply capacity and flexibility of PDN. However, under extreme high temperature, it is difficult to meet the demand of supply guarantee only by the switch reconfiguration. In response to this, demand response can be incorporated to reduce the power load in a certain period and ensure the power supply based on the essential and non-essential power demand of users when the extreme weather occurs and the reliable power supply of PDN is threatened.

Therefore, the present disclosure provides a supply guarantee method for a PDN considering demand response and dynamic reconfiguration, which regulates and controls the power consumption of users in extreme weather, so that the power grid can operate stably in extreme weather.

SUMMARY

The present disclosure aims to provide a supply guarantee method for a PDN considering demand response and dynamic reconfiguration, which includes the following steps: depicting a photovoltaic output, a wind turbine output and a load model according to meteorological factors of extreme high temperature weather, the meteorological factors including temperature and illumination, and constructing a user response model according to a user demand side response participation degree; determining outage loss coefficients of different power consumption scenarios, constructing a PDN load reliable supply model based on the outage loss coefficients, and solving the PDN load reliable supply model to obtain a PDN supply guarantee strategy.

Further, an expression of the photovoltaic output is:

$$P_{PV} = P_{PV,N} \frac{R_c}{R_{st}} [1 + \eta_K (T_C - T_{PV,st})]$$

where $P_{PV}$ is an actual output of photovoltaic power generation; $P_{PV,N}$ is a rated power of the photovoltaic output; $R_c$ is current solar radiation illuminance; $R_{st}$ is standard ambient (generally at 25° C.) solar radiation illuminance; $\eta_k$ is a photoelectric conversion efficiency; $T_c$ is an actual operation temperature of a photovoltaic panel; and $T_{PV,st}$ is a temperature of the photovoltaic panel under a standard condition.

Further, an expression of the wind turbine output is:

$$P_{wind} = 0.5 k A \delta_{wind} \rho_{air} V^3$$

where $P_{wind}$ is a wind turbine output; k is a wind power constant; A is a sweeping area of a wind turbine; $\delta_{wind}$ is a wind power factor; $\rho_{air}$ is an air density; and v is a wind velocity. Further, expressions of the load model are:

$$L_{t,eh} = L_{t,nor} + \Delta L_{t,eh}$$

$$\Delta L_{t,eh} = \beta_1 \Delta H_{t,temp} + \beta_2 \Delta H_{t,humi} + \beta_3 \Delta H_{t,rain} + \varepsilon$$

where $L_{t,eh}$ is the total load at a moment t under extreme high temperature weather; $L_{t,nor}$ is a predicted load value at the moment t assuming that the extreme high temperature weather does not occur; $\Delta L_{t,eh}$ is a load increment at the moment t caused by various meteorological factors; and $\beta_1$, $\beta_2$ and $\beta_3$ represent proportional coefficients of incremental power consumption caused by changes of temperature, humidity and precipitation, respectively; $\Delta H_{t,temp}$, $\Delta H_{t,humi}$ and $\Delta H_{t,rain}$ are the changes of actual temperature, humidity and precipitation under extreme weather, respectively; and $\varepsilon$ is an error term, representing the consumption difference that cannot be reflected by temperature, humidity and precipitation.

Further, expressions of the user response model are:

$$U_k = D_{i,t} M_{i,t} - \mu_{i,t} \varphi_{i,t}(D_{i,t}) + \omega_i D_{i,t}$$

$$\varphi_{i,t}(D_{i,t}) = \frac{\theta_{i,t}}{2}(D_{i,t})^2 + \lambda_{i,t} D_{i,t}, \theta_{i,t} > 0, \lambda_{i,t} > 0$$

where $U_k$ is a utility value of a user; $D_{i,t}$ is an actual response quantity of the user; $M_{i,t}$ is a circuit response optimization coefficient of the user; Hit is a penalty coefficient of endowment damage; $\varphi_{i,t}$ is an inconvenience degree caused by a user's response; $w_i$ is a non-essential power demand coefficient; $\varphi_{i,t}(D_{i,t})$ measures an inconvenience degree caused by users' participation in a demand response, $\theta_{i,t}$ is a secondary influence factor, and $\lambda_{i,t}$ is a primary influence factor.

Further, the determining the outage loss coefficient includes: obtaining various power consumption scenarios, and determining the photovoltaic output, wind turbine output and load demand under the different power consumption scenarios; reducing the various power consumption scenarios to a preset number of typical scenarios, and obtaining a probability of each typical scenario; and determining the outage loss coefficient based on a demand degree for electricity, a ratio of non-essential power demand to essential power demand and an outage influence degree in the typical scenarios.

Further, the PDN load reliable supply model includes an objective function and constraint conditions, the constraint conditions including a power flow constraint, a radial and connectivity constraint under network reconfiguration, a switch constraint, a node voltage constraint, a branch current constraint, a new energy output constraint and a load loss constraint.

Further, expressions of the objective function are:

$$f = \max(f_2 - f_1)$$

$$f_1 = \sum_{c=1}^{C} \pi_c \sum_{t=1}^{T} \sum_{i \in \eta} \lambda_i^k c_{LR} P_{t,i,c}^{LR} \Delta t$$

$$f_2 = \sum_{c=1}^{C} \pi_c \sum_{t=1}^{T} \sum_{i \in \eta} (D_{i,t,c} M_{i,t,c} - \mu_{i,t} \varphi_{i,t,c}(D_{i,t,c}) + \omega_i D_{i,t,c})$$

where f is the objective function; max( ) is a maximum value; $f_1$ is a first intermediate function; $f_2$ is a second intermediate function; c is a scenario variable; C is the total number of scenarios; $\pi_c$ is a probability of a scenario c; t is a time variable; T is the total number of hours; i is a node variable; η is a set of all nodes in a PDN; $\lambda_i^k$ is a node outage loss coefficient; $C_{LR}$ is a unit price of load reduction expenses; $P_{t,i,c}^{LR}$ is an active power of load reduction at a node n; Δt is a minimum time interval; $D_{i,t,c}$ is an actual response quantity of the user in the scenario c; $M_{i,t,c}$ is a circuit response optimization coefficient of the user in the scenario c; $\mu_{i,t}$ is a penalty coefficient of endowment damage; $\varphi_{i,t,c}(D_{i,t,c})$ measures an inconvenience degree caused by users' participation in a demand response in the scenario c; and $w_i$ is a non-essential power demand coefficient.

Expressions of the power flow constraint are:

$$\sum_{m \in f(n)} P_{t,mn,c} - r_{mn} \tilde{I}_{t,mn,c} = \sum_{k \in s(n)} p_{t,kn,c} - P_{t,n,c}$$

$$\sum_{m \in f(n)} Q_{t,mn,c} - x_{mn} \tilde{I}_{t,mn,c} = \sum_{k \in s(n)} Q_{t,kn,c} - Q_{t,n,c}$$

$$P_{t,n,c} = P_{t,n,c}^{Sub} + P_{t,n,c}^{PV} + P_{t,n,c}^{WT} - P_{t,n,c}^{load} + P_{t,n,c}^{LR}$$

$$Q_{t,n,c} = Q_{t,n,c}^{Sub} - Q_{t,n,c}^{load} + Q_{t,n,c}^{LR}$$

$$-M(1-\alpha_{t,mn,c}) + \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c}$$

$$M(1-\alpha_{t,mn,c}) + \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c}$$

$$\tilde{U}_{t,n,c} = \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c}, \forall mn \in \varphi_b/\varphi_{sw}$$

$$\left\| \begin{array}{c} 2P_{t,mn,c} \\ 2Q_{t,mn,c} \\ \tilde{I}_{t,mn,c} - \tilde{U}_{t,m,c} \end{array} \right\| \le \tilde{I}_{t,mn,c} + \tilde{U}_{t,m,c}$$

where m and k are mutually different node serial numbers; f (n) is a set of branch terminal nodes with n as an initial node in the PDN; $P_{t,mn,c}$ and $Q_{t,mn,c}$ are an active power and a reactive power transmitted on a branch mn during a $t^{th}$ period in a $c^{th}$ scenario, respectively; $r_{mn}$ and $x_{mn}$ are a resistance value and a reactance value of the branch mn, respectively; $\tilde{I}_{t,mn,c}$ is a square of a current amplitude of the branch mn during the $t^{th}$ period in the $c^{th}$ scenario; s(n) is a set of branch initial nodes with a node n as a terminal node; $P_{t,kn,c}$ and $Q_{t,kn,c}$ are an active power and a reactive power transmitted on a branch kn during the $t^{th}$ period in the $c^{th}$ scenario, respectively; $P_{t,n,c}$ and $Q_{t,n,c}$ are an active power and a reactive power injected at the node n during the $t^{th}$ period in the $c^{th}$ scenario, respectively; $P_{t,n,c}^{Sub}$ and $Q_{t,n,c}^{Sub}$ are an active power and a reactive power injected at the node n into a substation during the $t^{th}$ period in the $c^{th}$ scenario; $P_{t,n,c}^{PV}$ and $P_{t,n,c}^{WT}$ are actual powers of photovoltaic power generation and wind power generation connected to a power grid of the node n during the $t^{th}$ period in the $c^{th}$ scenario; $P_{t,n,c}^{LR}$ and $Q_{t,n,c}^{LR}$ are an active power and a reactive power of load reduction at the node n during the $t^{th}$ period in the $c^{th}$ scenario; $P_{t,n,c}^{load}$ and $Q_{t,n,c}^{load}$ are an active power and a reactive power of load injected at the node n during the $t^{th}$ period in the $c^{th}$ scenario; M is a penalty factor of a big M method; $\alpha_{t,mn,c}$ is a state variable of a switch on the branch mn during the $t^{th}$ period in the $c^{th}$ scenario, $\alpha_{t,mn,c}=1$ represents that the switch is closed, and $\alpha_{t,mn,c}=0$ represents that the switch is open; $\tilde{U}_{t,n,c}$ and $\tilde{U}_{t,m,c}$ are squares of voltage amplitudes of nodes m and n during the $t^{th}$ period in the $c^{th}$ scenario, respectively; $\varphi_{sw}$ represents a set of switching branches in an optimization area; and $\varphi_b$ is a set of all branches with tie lines in a power distribution system.

Expressions of the radial and connectivity constraint under network reconfiguration are:

$$N^{always} + \sum_{mn \in E^{OA}} \alpha_{mn,c} = N - N^{sub}$$

$$\sum_{k \in f(n)} P_{nk,c}^* - \sum_{k \in s(n)} P_{mn,c}^* = P_{n,c}^* = p$$

$$-\alpha_{mn,c} P_{mn,max} \le P_{mn,c}^* \le \alpha_{mn,c} P_{mn,max}, \forall mn \in \varphi_{sw}$$

$$-P_{mn,max} \le P_{mn,c}^* \le P_{mn,max}, \forall mn \in \varphi_b/\varphi_{sw}$$

where, $N^{always}$ is the total number of non-adjustable branches that are always in a closed state; mn is a branch; $E^{OA}$ is a set of switching branches in an optimization area; $\alpha_{mn,c}$ represents a state variable of a switch on the branch mn in a $c^{th}$ scenario; N is the total number of nodes; $N^{sub}$ is the number of substations for power injection; $P^*_{nk,c}$ is an active power of auxiliary power flow on an nk branch in a scenario c, rather than an active power on an actual line; $P^*_{mn,c}$ is an active power of auxiliary power flow on the branch mn in the scenario c, rather than an active power on an actual line; $P^*_{n,c}$ is an active power of auxiliary power flow injected at a node n in the scenario c; p is a power injected at the node; and $P_{mn,max}$ represents a maximum value of the active power transmitted by the branch mn.

Expressions of the switch constraint are:

$$\begin{cases} \alpha_{mn,t,c}^{Close} + \alpha_{mn,t,c}^{Open} \le 1, mn \in E^{OA} \\ \alpha_{mn,t,c} + \alpha_{mn,t-1,c} = \alpha_{mn,t,c}^{Close} - \alpha_{mn,t,c}^{Open} \end{cases}$$

$$\begin{cases} \sum_{t=1}^{T} |\alpha_{mn,t,c} - \alpha_{mn,t-1,c}| \le X_{l,max}, mn \in \varphi_b \\ \sum_{mn \in \varphi_b} \sum_{t=1}^{T} |\alpha_{mn,t,c} - \alpha_{mn,t-1,c}| \le X_{max} \end{cases}$$

where $\alpha_{mn,t,c}^{close}$ and a, $\alpha_{mn,t,c}^{Open}$ are state quantities of switch closing or opening in a $c^{th}$ scenario, $\alpha_{nm,t,c}^{close}=1$ represents a closing action of a switch, and $\alpha_{mn,t,c}^{Open}=1$ represents an opening action of the switch; $E^{OA}$ is a set of switching branches in an optimization area; $\alpha_{mn,t,c}$ and $\alpha_{mn,t-1,c}$ are switching states of a branch mn during t and t−1 periods in the $c^{th}$ scenario; $X_{i,max}$ is the maximum number of state operations of a single switch; L is the total number of branches with tie lines; and $X_{max}$ is the maximum number of operations of all switches.

An expression of the node voltage constraint is:

$$U_{m,min} \leq U_{t,m,c} \leq U_{m,max}$$

where $U_{m,min}$ and $U_{m,max}$ are a lower limit and an upper limit of a voltage amplitude of a node m, respectively; and $U_{t,m,c}$ is the voltage amplitude of the node m.

Expressions of the branch current constraint are:

$$I_{mn,min} \leq I_{mn,t,c} \leq I_{mn,max} \quad \forall mn \in \varphi_L/\varphi_{Sw}$$

$$\alpha_{mn,t,c} I_{mn,min} \leq I_{mn,t,c} \leq \alpha_{mn,t,c} I_{mn,max}, \quad \forall mn \in \varphi_{sw}$$

where $I_{mn,min}$ and $I_{mn,max}$ are a lower limit and an upper limit of a current amplitude of a branch mn, respectively; $I_{mn,t,c}$ is the current amplitude of the branch mn; and $\alpha_{mn,t,c}$ is a switch state on the branch mn.

Expressions of the new energy output constraint are:

$$P_{m,t}^{PV,min} \leq P_{m,t,c}^{PV} \leq P_{m,t}^{PV,max}$$

$$P_{m,t}^{WT,min} \leq P_{m,t,c}^{WT} \leq P_{m,t}^{WT,max}$$

where $P_{m,t}^{PV,min}$ and $P_{m,t}^{PV,max}$ are a lower limit and an upper limit of an actual output of photovoltaic power generation, respectively; $P_{m,t}^{WT,min}$ and $P_{m,t}^{WT,max}$ are a lower limit and an upper limit of an actual output of wind power generation, respectively; $P_{m,t,c}^{PV}$ is the actual output of photovoltaic power generation; and $P_{m,t,c}^{WT}$ is the actual output of wind power generation. An expression of the load loss constraint is:

$$0 \leq P_{t,n,c}^{LR} \leq \alpha_n^{LR} P_{t,n,c}^{L}$$

where $P_{t,n,c}^{LR}$ is a load loss capacity of a node n; $\alpha_n^{LR}$ is a load loss proportional coefficient of the node n; and $P_{t,n,c}^{L}$ is a load capacity of the node n.

The technical solutions of embodiments of the present disclosure have at least the following advantages and beneficial effects:

The present disclosure has the beneficial effects that, in view of the problems that the source-load behavior will be strongly influenced by the environment, and the imbalance between power supply and demand will lead to huge load loss costs in the power grid, the present disclosure provides a supply guarantee method for a PDN considering demand response and dynamic reconfiguration. Using this method, the reliability requirement levels of different loads in the PDN are classified to give priority to meeting the power demand of important loads, which can effectively guarantee the power consumption of users in the extreme high temperature weather and improve the reliability and economy of power grid operation, with use value.

DETAILED DESCRIPTION

In order to make the object, technical solutions and advantages of embodiments of the present disclosure clearer, the technical solutions in the embodiments of the present disclosure is described clearly and completely below with reference to the attached drawings in the embodiments of the present disclosure. Obviously, all the described embodiments are only some, rather than all embodiments of the present disclosure. Components of the embodiments of the present disclosure generally described and illustrated in the attached drawings herein can be arranged and designed in various different configurations.

Figure 1:
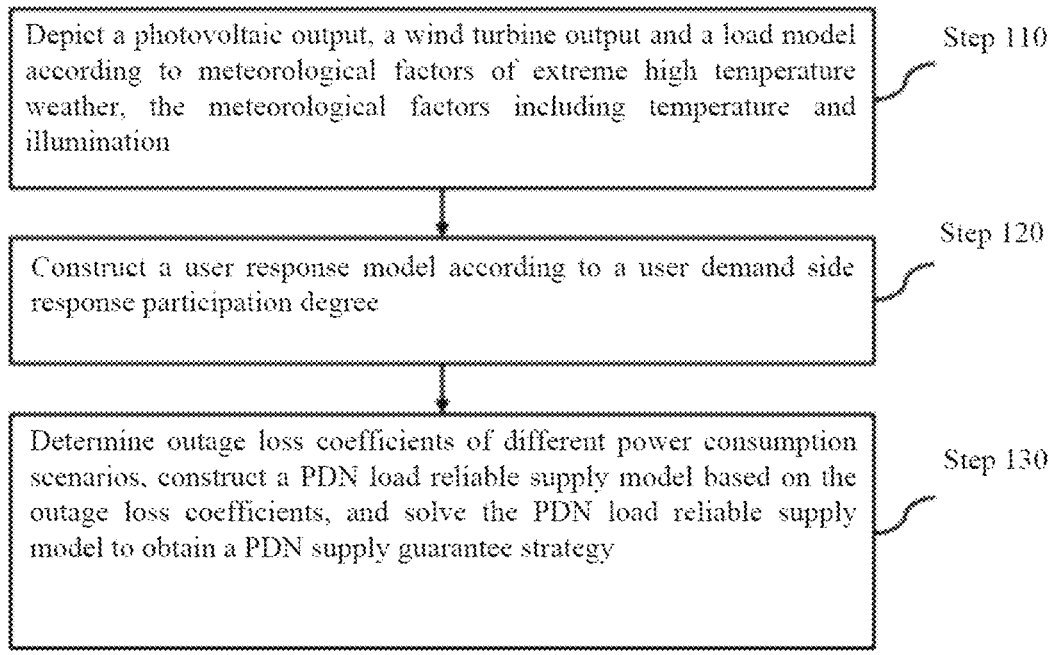
FIG. 1 is an exemplary flow chart of a supply guarantee method for a PDN considering demand response and dynamic reconfiguration provided by the present disclosure.

FIG. 1 is an exemplary flow chart of a supply guarantee method for a PDN considering demand response and dynamic reconfiguration provided by the present disclosure. As shown in FIG. 1, a process 100 includes the following contents:

In step 110: a photovoltaic output, a wind turbine output and a load model are depicted according to meteorological factors of extreme high temperature weather.

The meteorological factors can refer to various factors related to meteorology. For example, the meteorological factors may include temperature and illumination. The extreme high temperature weather can refer to unusually hot weather, with temperature far exceeding the normal temperature in a certain area or season. For example, the temperature in Chengdu in summer exceeding 40 degrees Celsius can be considered as extreme high temperature weather.

The photovoltaic output generally depends on environmental temperature, light intensity, a rated power and other factors. When the extreme high temperature weather occurs, the temperature rises sharply, the photovoltaic will shut down, and the output is 0. An expression of the photovoltaic output based on the influencing factors is:

$$P_{PV} = P_{PVN} \frac{R_c}{R_{st}} [1 + \eta_K (T_C - T_{PV,st})]$$

where $P_{PV}$ is an actual output of photovoltaic power generation; $P_{PV,N}$ is a rated power of the photovoltaic output; $R_c$ is current solar radiation illuminance; $R_{st}$ is standard ambient (generally at 25° C.) solar radiation illuminance; $\eta_k$ is a photoelectric conversion efficiency; $T_c$ is an actual operation temperature of a photovoltaic panel; and $T_{PV,st}$ is a temperature of the photovoltaic panel under a standard condition.

The wind turbine output generally depends on factors such as wind velocity and air density. When the extreme high temperature weather occurs, the air density decreases and the wind velocity greatly decreases. When the wind velocity is lower than a cut-in wind velocity, the wind power output can be reduced to 0. An expression of the wind turbine output based on the influencing factors is:

$$P_{wind} = 0.5 k A \delta_{wind} \rho_{air} V^3$$

where $P_{wind}$ is a wind turbine output; k is a wind power constant; A is a sweeping area of a wind turbine; $\delta_{wind}$ is a wind power factor; $\rho_{air}$ is an air density; and v is a wind velocity.

There is a strong coupling among electricity load and environmental temperature and other meteorological factors in extreme high temperature weather, and the curve of meteorological factors (temperature, humidity and precipitation) is basically similar to the change law of load curve, which has a positive correlation. Based on this, expressions of the load model under extreme weather are:

$$L_{t,eh} = L_{t,nor} + \Delta L_{t,eh}$$

$$\Delta L_{t,eh} = \beta_1 \Delta H_{t,temp} + \beta_2 \Delta H_{t,humi} + \beta_3 \Delta H_{t,rain} + \varepsilon$$

where $L_{t,eh}$ is the total load at a moment t in extreme high temperature weather; $L_{t,nor}$ is a predicted load value at the moment t assuming that the extreme high temperature weather does not occur; $\Delta L_{t,eh}$ is a load increment at the moment t caused by various meteorological factors; and $\beta_1$, $\beta_2$ and $\beta_3$ represent proportional coefficients of incremental power consumption caused by changes of temperature, humidity and precipitation, respectively; $\Delta H_{t,temp}$, $\Delta H_{t,humi}$ and $\Delta H_{t,rain}$ are the changes of actual temperature, humidity and precipitation under extreme weather, respectively; and $\varepsilon$ is an error term, representing the consumption difference that cannot be reflected by temperature, humidity and precipitation. The coefficients and parameters in the formula are related to load type, geographical location, climate and environment, economy, industry and population.

In step 120: according to a user demand side response participation degree, a user response model is constructed. The user demand side response participation degree can be related to the non-essential power consumption of the user. Considering that users have a variety of usage requirements for electric energy, the usage requirements can be divided into non-essential requirements and essential requirements. The non-essential requirement refers to the requirement that does not affect the production and life of users; and the essential requirement refers to the demand that affects the production and life of the users. The user demand side response participation degree refers to a degree or proportion of users' participation in demand side response behavior when reducing the demand response of electric power in extreme high temperature weather.

Expressions of the user response model are:

$$U_k = D_{i,t} M_{i,t} - \mu_{i,t} \varphi_{i,t}(D_{i,t}) + \omega_i D_{i,t}$$

$$\varphi_{i,t}(D_{i,t}) = \frac{\theta_{i,t}}{2}(D_{i,t})^2 + \lambda_{i,t} D_{i,t}, \theta_{i,t} > 0, \lambda_{i,t} > 0$$

where $U_k$ is a utility value of a user; $D_{i,t}$ is an actual response quantity of the user; $M_{i,t}$ is a circuit response optimization coefficient of the user, indicating a unit degree that the stability of a power grid in an area can be improved when responding to the demand; $\mu_{i,t}$ is a penalty coefficient of endowment damage, indicating the influence on a circuit caused by the user's failure to respond to demand; $\varphi_{i,t}$ is an inconvenience degree caused by a user's response; $\omega_i$ is a non-essential power demand coefficient; $\varphi_{i,t}(D_{i,t})$ measures an inconvenience degree caused by users' participation in a demand response (for example, the inconvenience degree caused by reducing lighting to production in a factory), and is defined as an approximate convex quadratic function, meaning that the inconvenience degree will increase significantly with the increase of response; and $\theta_{i,t}$ is a secondary influence factor, and $\lambda_{i,t}$ is a primary influence factor, which are determined by external factors that affect the user's response behavior, such as temperature, humidity and wind velocity.

In step 130: outage loss coefficients of different power consumption scenarios are determined, a PDN load reliable supply model is constructed based on the outage loss coefficients, and the PDN load reliable supply model is solved to obtain a PDN supply guarantee strategy.

The outage loss coefficient can refer to an index of the loss caused by the outage in the power consumption scenario, and can be used to characterize the demand for electricity in the power consumption scenario. The PDN reliable load supply model can be used to generate a PDN supply guarantee strategy according to power consumption scenarios and power supply characteristics of PDN. The power supply guarantee strategy of PDN can refer to the strategy of power supply under extreme high temperature weather. The outage loss coefficient being determined includes that: various power consumption scenarios are obtained, and the photovoltaic output, wind turbine output and load demand are determined under the different power consumption scenarios; the various power consumption scenarios are reduced to a preset number of typical scenarios, and a probability of each typical scenario is obtained; and the outage loss coefficient is determined based on a demand degree for electricity, a ratio of non-essential power demand to essential power demand and an outage influence degree in the typical scenarios.

For example, according to the degree of outage loss and the characteristics of power consumption, the three categories of users (industrial, commercial and residential) are subdivided into seven types: residential, government agencies, commercial, small industries, important industries, medical and health care, and public utilities.

For another example, a large number of scenarios are generated by the Monte Carlo random sampling method, and the photovoltaic, wind turbine output and load demand in different scenarios are obtained. The scenarios are reduced to 8 typical output scenarios by the k-means scenario clustering method, and the probability of each scenario is obtained, to simulate the uncertainty of the three.

The PDN load reliable supply model includes an objective function and constraint conditions, the constraint conditions including a power flow constraint, a radial and connectivity constraint under network reconfiguration, a switch constraint, a node voltage constraint, a branch current constraint, a new energy output constraint and a load loss constraint. The objective function can be related to the load loss cost and the utility value of the user. The objective function is the load loss cost and the utility value of the user that maximize the power supply priority.

Expressions of the objective function are:

$$f = \max(f_2 - f_1)$$

$$f_1 = \sum_{c=1}^{c} \pi_c \sum_{t=1}^{T} \sum_{i \in \eta} \lambda_i^k c_{LR} P_{t,i,c}^{LR} \Delta t$$

$$f_2 = \sum_{c=1}^{c} \pi_c \sum_{t=1}^{T} \sum_{i \in \eta} (D_{i,t,c} M_{i,t,c} - \mu_{i,t} \varphi_{i,t,c}(D_{i,t,c}) + \omega_i D_{i,t,c})$$

where f is the objective function; max( ) is a maximum value; $f_1$ is a first intermediate function; $f_2$ is a second intermediate function; c is a scenario variable; C is the total number of scenarios; $\pi_c$ is a probability of a scenario c; t is a time variable; T is the total number of hours; i is a node variable; n is a set of all nodes in a PDN; $\lambda_i^k$ is a node outage loss coefficient; $C_{LR}$ is a unit price of load reduction expenses; $P_{t,i,c}^{LR}$ is an active power of load reduction at a node n; $\Delta t$ is a minimum time interval; $D_{i,t,c}$ is an actual response quantity of the user in the scenario c; $M_{i,t,c}$ is a circuit response optimization coefficient of the user in the scenario c; $\mu_{i,t}$ is a penalty coefficient of endowment damage; $\varphi_{i,t,c}(D_{i,t,c})$ measures an inconvenience degree caused by users' participation in a demand response in the scenario c; and $\omega_i$ is a non-essential power demand coefficient.

Expressions of the power flow constraint are:

$$\sum_{m\in f(n)} P_{t,mn,c} - r_{mn}\tilde{I}_{t,mn,c} = \sum_{k\in s(n)} P_{t,kn,c} - P_{t,n,c}$$

$$\sum_{m\in f(n)} Q_{t,mn,c} - x_{mn}\tilde{I}_{t,mn,c} = \sum_{k\in s(n)} Q_{t,kn,c} - Q_{t,n,c}$$

$$P_{t,n,c} = P_{t,n,c}^{Sub} + P_{t,n,c}^{PV} + P_{t,n,c}^{WT} - P_{t,n,c}^{load} + P_{t,n,c}^{LR}$$

$$Q_{t,n,c} = Q_{t,n,c}^{Sub} - Q_{t,n,c}^{load} + Q_{t,n,c}^{LR}$$

$$-M(1-\alpha_{t,mn,c}) + \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c}$$
$$\leq \tilde{U}_{t,n,c} \leq$$
$$M(1-\alpha_{t,mn,c}) + \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c},$$
$$\forall mn \in \varphi_{sw}$$

$$\tilde{U}_{t,n,c} = \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c}, \forall mn \in \varphi_b/\varphi_{sw}$$

$$\left\| \begin{matrix} 2P_{t,mn,c} \\ 2Q_{t,mn,c} \\ \tilde{I}_{t,mn,c} - \tilde{U}_{t,m,c} \end{matrix} \right\| \leq \tilde{I}_{t,mn,c} + \tilde{U}_{t,m,c}$$

where m and k are mutually different node serial numbers; f(n) is a set of branch terminal nodes with n as an initial node in the PDN; $P_{t,mn,c}$ and $Q_{t,mn,c}$ are an active power and a reactive power transmitted on a branch mn during a $t^{th}$ period in a $c^{th}$ scenario, respectively; $r_{mn}$ and $x_{mn}$ are a resistance value and a reactance value of the branch mn, respectively; $\tilde{I}_{t,mn,c}$ is a square of a current amplitude of the branch mn during the $t^{th}$ period in the $c^{th}$ scenario; s(n) is a set of branch initial nodes with a node n as a terminal node; $P_{t,kn,c}$ and $Q_{t,kn,c}$ are an active power and a reactive power transmitted on a branch kn during the $t^{th}$ period in the $c^{th}$ scenario, respectively; $P_{t,n,c}$ and $Q_{t,n,c}$ are an active power and a reactive power injected at the node n during the $t^{th}$ period in the $c^{th}$ scenario, respectively; $P_{t,n,c}^{Sub}$ and $Q_{t,n,c}^{Sub}$ are an active power and a reactive power injected at the node n into a substation during the $t^{th}$ period in the $c^{th}$ scenario; $P_{t,n,c}^{PV}$, and $P_{t,n,c}^{WT}$ are actual powers of photovoltaic power generation and wind power generation connected to a power grid of the node n during the $t^{th}$ period in the $c^{th}$ scenario; $P_{t,n,c}^{LR}$, and $Q_{t,n,c}^{LR}$ are an active power and a reactive power of load reduction at the node n during the $t^{th}$ period in the $c^{th}$ scenario; $P_{t,n,c}^{load}$ and $Q_{t,n,c}^{load}$ are an active power and a reactive power of load injected at the node n during the $t^{th}$ period in the $c^{th}$ scenario; M is a penalty factor of a big M method; $\alpha_{t,mn,c}$ is a state variable of a switch on the branch mn during the $t^{th}$ period in the $c^{th}$ scenario, $\alpha_{t,mn,c}=1$ represents that the switch is closed, and $\alpha_{t,mn,c}=0$ represents that the switch is open; $\tilde{U}_{t,n,c}$ and $\tilde{U}_{t,m,c}$ are squares of voltage amplitudes of nodes m and n during the $t^{th}$ period in the $c^{th}$ scenario, respectively; $\varphi_{sw}$ represents a set of switching branches in an optimization area; and $\varphi_b$ is a set of all branches with tie lines in a power distribution system.

An expression of the radial and connectivity constraint under network reconfiguration is:

$$N^{always} + \sum_{mn\in E^{OA}} \alpha_{mn,c} = N - N^{sub}$$

Due to the presence of many distributed photovoltaic nodes in the PDN, it cannot be guaranteed that there are no isolated islands and a running state of a ring network after dynamic network reconfiguration under the above constraints. Therefore, the network connectivity is ensured by introducing a smaller node injection power p combined with the power flow constraint:

$$\sum_{k\in f(n)} P^*_{nk,c} - \sum_{k\in s(n)} P^*_{mn,c} = P^*_{n,c} = \rho$$

$$-\alpha_{mn,c}P_{mn,max} \leq P^*_{mn,c} \leq \alpha_{mn,c}P_{mn,max}, \forall mn \in \varphi_{sw}$$

$$-P_{mn,max} \leq P^*_{mn,c} \leq P_{mn,max}, \forall mn \in \varphi_b/\varphi_{sw}$$

where, $N^{always}$ is the total number of non-adjustable branches that are always in a closed state; mn is a branch; $E^{OA}$ is a set of switching branches in an optimization area; $\alpha_{mn,c}$ represents a state variable of a switch on the branch mn in a $c^{th}$ scenario; N is the total number of nodes; $N^{sub}$ is the number of substations for power injection; $P^*_{nk,c}$ is an active power of auxiliary power flow on an nk branch in a scenario c, rather than an active power on an actual line; $P_{mn,c}$ is an active power of auxiliary power flow on the branch mn in the scenario c, rather than an active power on an actual line; $P^*_{n,c}$ is an active power of auxiliary power flow injected at a node n in the scenario c; p is a power injected at the node; and $P_{mn,max}$ represents a maximum value of the active power transmitted by the branch mn.

The switch in the PDN can only be in one of the opening and closed states at the same moment, and excessive operations on switch can shorten the service life of the equipment and affect the network operation safety. Therefore, it is necessary to limit the state of the switch and the operation times in the dynamic reconfiguration of PDN. Expressions of the switch constraint are:

$$\begin{cases} \alpha_{mn,t,c}^{Close} + \alpha_{mn,t,c}^{Open} \leq 1, mn \in E^{OA} \\ \alpha_{mn,t,c} + \alpha_{mn,t-1,c} = \alpha_{mn,t,c}^{Close} - \alpha_{mn,t,c}^{Open} \end{cases}$$

$$\begin{cases} \sum_{t=1}^{T} |\alpha_{mn,t,c} - \alpha_{mn,t-1,c}| \leq X_{l,max}, mn \in \varphi_b \\ \sum_{mn\in\varphi_b} \sum_{t=1}^{T} |\alpha_{mn,t,c} - \alpha_{mn,t-1,c}| \leq X_{max} \end{cases}$$

where $\alpha_{mn,t,c}^{Close}$ and $\alpha_{mn,t,c}^{Open}$ are state quantities of switch closing or opening in a $c^{th}$ scenario, $\alpha_{mn,t,c}^{Close}=1$ represents a closing action of a switch, and $\alpha_{mn,t,c}^{Open}=1$ represents an opening action of the switch; $E^{OA}$ is a set of switching branches in an optimization area; $\alpha_{mn,t,c}$ and $\alpha_{mn,t-1,c}$ are switching states of a branch mn during t and t−1 periods in the $c^{th}$ scenario; $X_{l,max}$ is the maximum number of state operations of a single switch; L is the total number of branches with tie lines; and $X_{max}$ is the maximum number of operations of all switches.

An expression of the node voltage constraint is:

$$U_{m,min} \leq U_{t,m,c} \leq U_{m,max}$$

where $U_{m,min}$ and $U_{m,max}$ are a lower limit and an upper limit of a voltage amplitude of a node m, respectively; and $U_{t,m,c}$ is the voltage amplitude of the node m.

Expressions of the branch current constraint are:

$$I_{mn,min} \leq I_{mn,t,c} \leq I_{mn,max}, \forall mn \in \varphi_b/\varphi_{sw}$$

$$\alpha_{mn,t,c}I_{mn,min} \leq I_{mn,t,c} \leq \alpha_{mn,t,c}I_{mn,max}, \forall mn \in \varphi_{sw}$$

where $I_{mn,min}$ and $I_{mn,max}$ are a lower limit and an upper limit of a current amplitude of a branch mn, respectively;

$I_{mn,t,c}$ is the current amplitude of the branch mn; and $\alpha_{mn,t,c}$ is a switch state on the branch mn.

In the actual situation, the output of PV and WT connected to the PDN cannot exceed upper and lower limits of an allowable output. Expressions of the new energy output constraint are:

$$P_{m,t}^{PV,min} \leq P_{m,t,c}^{PV} \leq P_{m,t}^{PV,max}$$

$$P_{m,t}^{WT,min} \leq P_{m,t,c}^{WT} \leq P_{m,t}^{WT,max}$$

where $P_{m,t}^{PV,min}$ and $P_{m,t}^{PV,max}$ are a lower limit and an upper limit of an actual output of photovoltaic power generation, respectively; $P_{m,t}^{WT,min}$ and $P_{m,t}^{WT,max}$ are a lower limit and an upper limit of an actual output of wind power generation, respectively; $P_{m,t,c}^{PV}$ is the actual output of photovoltaic power generation; and $P_{m,t,c}^{WT}$ is the actual output of wind power generation.

An expression of the load loss constraint is:

$$0 \leq P_{t,n,c}^{LR} \leq \alpha_n^{LR} P_{t,n,c}^{L}$$

where $P_{t,n,c}^{LR}$ is a load loss capacity of a node n; $\alpha_n^{LR}$ is a load loss proportional coefficient of the node n; and $P_{t,n,c}^{L}$ is a load capacity of the node n.

Figure 2:
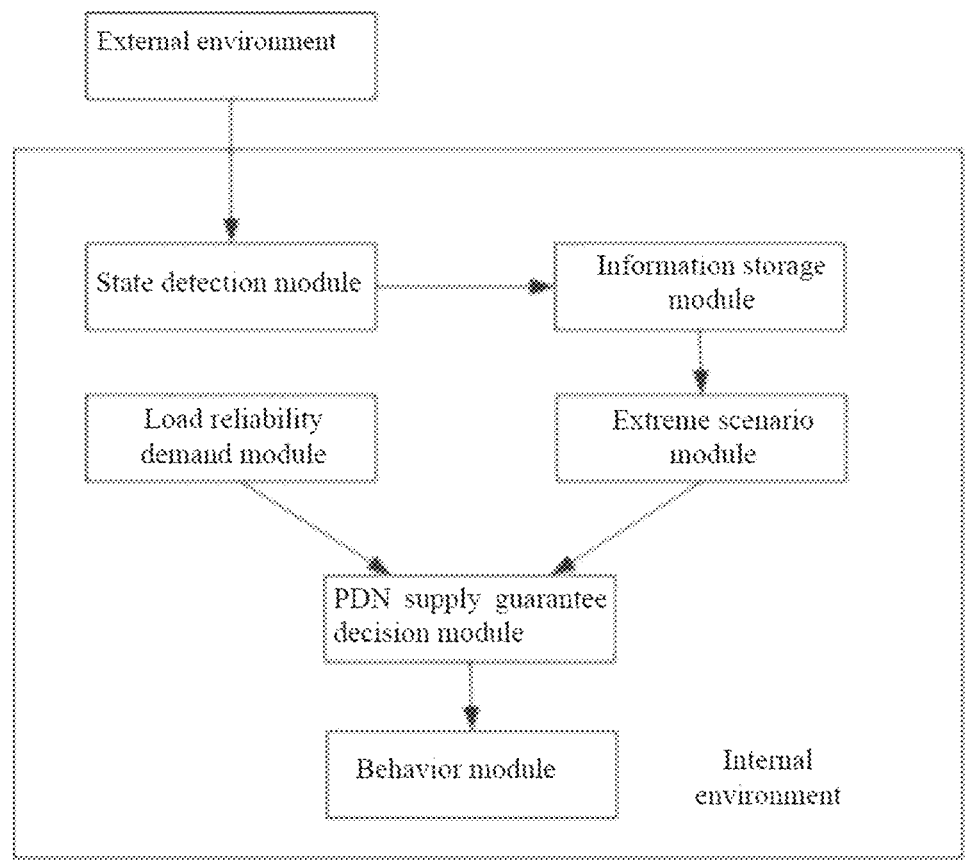
FIG. 2 is an exemplary block diagram of a PDN reliable load supply system provided by the present disclosure.

FIG. 2 is an exemplary block diagram of a PDN reliable load supply system provided by the present disclosure.

As shown in FIG. 2, the PDN reliable load supply system includes a state detection module, an information storage module, an extreme scenario module, a load reliability demand module, a PDN supply guarantee decision module, and a behavior module. The state detection module is configured to detect all kinds of meteorological real-time data and photovoltaic and wind turbine operation parameters under urban extreme high temperature weather and store them in the information storage module. The information storage module is configured to store the real-time data information and operation parameters. The extreme scenario module is configured to obtain photovoltaic, wind turbine output data and load power consumption data based on the meteorological data and the operation parameters. The load reliability demand module is configured to obtain outage loss coefficients of different users. The PDN supply guarantee decision module, that is, a PDN reliable load supply model solving module considering demand response and network reconfiguration, is configured to obtain a final PDN dynamic reconfiguration and demand response result. The behavior module is configured to remotely control opening and closing actions of sectional switches and interconnection switches of the PDN according to the corresponding reconfiguration solution, and issue compensation to users according to the demand response result.

The above is only the preferred embodiment of the present disclosure, and it is not used to limit the present disclosure. For those skilled in the art, the present disclosure can be modified and varied. Any modifications, equivalent substitutions and improvements made within the spirit and principle of the present disclosure are to be included in the scope of protection of the present disclosure.

The invention claimed is:

1. A supply guarantee method for a power distribution network (PDN) considering demand response and dynamic reconfiguration, comprising:

depicting a photovoltaic output, a wind turbine output and a load model according to meteorological factors, the meteorological factors comprising temperature and illumination, and constructing a user response model according to a user demand side response participation degree, expressions of the user response model being:

$$U_k = D_{i,t} M_{i,t} - \mu_{i,t} \varphi_{i,t}(D_{i,t}) + \omega_i D_{i,t}$$

$$\varphi_{i,t}(D_{i,t}) = \frac{\theta_{i,t}}{2}(D_{i,t})^2 + \lambda_{i,t} D_{i,t}, \ \theta_{i,t} > 0, \ \lambda_{i,t} > 0$$

where $U_k$ is a utility value of a user; $D_{i,t}$ is an actual response quantity of the user; $M_{i,t}$ is a circuit response optimization coefficient of the user; $\mu_{i,t}$ is a penalty coefficient of endowment damage; $\varphi_{i,t}$ is an inconvenience degree caused by a user's response; $\omega_i$ is a non-essential power demand coefficient; $\varphi_{i,t}(D_{i,t})$ measures an inconvenience degree caused by users' participation in a demand response, $\theta_{i,t}$ is a secondary influence factor, and $\lambda_{i,t}$ is a primary influence factor; and determining outage loss coefficients of different power consumption scenarios, constructing a PDN load reliable supply model based on the outage loss coefficients, and solving the PDN load reliable supply model to obtain a PDN supply guarantee strategy; determining the outage loss coefficient, comprising: obtaining various power consumption scenarios, and determining the photovoltaic output, wind turbine output and load demand under the different power consumption scenarios; reducing the various power consumption scenarios to a preset number of typical scenarios, and obtaining a probability of each typical scenario; and determining the outage loss coefficient based on a demand degree for electricity, a ratio of non-essential power demand to essential power demand and an outage influence degree in the typical scenarios;

the PDN load reliable supply model comprising an objective function and constraint conditions, the constraint conditions comprising a power flow constraint, a radial and connectivity constraint under network reconfiguration, a switch constraint, a node voltage constraint, a branch current constraint, a new energy output constraint and a load loss constraint, expressions of the objective function being:

$$f = \max(f_2 - f_1)$$

$$f_1 = \sum_{c=1}^{C} \pi_c \sum_{t=1}^{T} \sum_{i \in \eta} \lambda_i^k c_{LR} P_{t,i,c}^{LR} \Delta t$$

$$f_2 = \sum_{c=1}^{C} \pi_c \sum_{t=1}^{T} \sum_{i \in \eta} (D_{i,t,c} M_{i,t,c} - \mu_{i,t} \varphi_{i,t,c}(D_{i,t,c}) + \omega_i D_{i,t,c})$$

where f is the objective function; max( ) is a maximum value; $f_1$ is a first intermediate function; $f_2$ is a second intermediate function; c is a scenario variable; C is the total number of scenarios; $\pi_c$ is a probability of a scenario c; t is a time variable; T is the total number of hours; i is a node variable; $\eta$ is a set of all nodes in a PDN; $\lambda_i^k$ is a node outage loss coefficient; $C_{LR}$ is a unit price of load reduction expenses; $P_{t,i,c}^{LR}$ is an active power of load reduction at a node n; $\Delta t$ is a minimum time interval; $D_{i,t,c}$ is an actual response quantity of the user in the scenario c; $M_{i,t,c}$ is a circuit response optimization coefficient of the user in the scenario c; $\mu_{i,t}$ is a penalty coefficient of endowment damage; $\varphi_{i,t,c}(D_{i,t,c})$ measures an inconvenience degree caused by users' participation in a demand response in the scenario c; and $\omega_i$ is a non-essential power demand coefficient;

expressions of the power flow constraint being:

$$\sum_{m \in f(n)} P_{t,mn,c} - r_{mn} \tilde{I}_{t,mn,c} = \sum_{k \in s(n)} P_{t,kn,c} - P_{t,n,c}$$

$$\sum_{m \in f(n)} Q_{t,mn,c} - x_{mn} \tilde{I}_{t,mn,c} = \sum_{k \in s(n)} Q_{t,kn,c} - Q_{t,n,c}$$

$$P_{t,n,c} = P_{t,n,c}^{Sub} + P_{t,n,c}^{PV} + P_{t,n,c}^{WT} - P_{t,n,c}^{load} + P_{t,n,c}^{LR}$$

$$Q_{t,n,c} = Q_{t,n,c}^{Sub} - Q_{t,n,c}^{load} + Q_{t,n,c}^{LR}$$

$$-M(1 - \alpha_{t,mn,c}) + \tilde{U}_{t,m,c} -$$
$$2(r_{mn}P_{t,mn,c} + x_{mn}Q_{t,mn,c}) + (r_{mn}^2 + x_{mn}^2)\tilde{I}_{t,mn,c} \leq \tilde{U}_{t,n,c} \leq$$
$$M(1 - \alpha_{t,mn,c}) + \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c},$$
$$\forall mn \in \varphi_{sw}$$

$$\tilde{U}_{t,n,c} = \tilde{U}_{t,m,c} - 2(r_{mn}P_{t,mn,c} + x_{mn}Q_{t,mn,c}) + (r_{mn}^2 + x_{mn}^2)\tilde{I}_{t,mn,c}, \forall mn \in \varphi_b/\varphi_{sw}$$

$$\left\| \begin{array}{c} 2P_{t,mn,c} \\ 2Q_{t,mn,c} \\ \tilde{I}_{t,mn,c} - \tilde{U}_{t,m,c} \end{array} \right\| \leq \tilde{I}_{t,mn,c} + \tilde{U}_{t,m,c}$$

where m and k are mutually different node serial numbers; f(n) is a set of branch terminal nodes with n as an initial node in the PDN; $P_{t,mn,c}$ and $Q_{t,mn,c}$ are an active power and a reactive power transmitted on a branch mn during a $t^{th}$ period in a $c^{th}$ scenario, respectively; $r_{mn}$ and $x_{mn}$ are a resistance value and a reactance value of the branch mn, respectively; $\tilde{I}_{t,mn,c}$ is a square of a current amplitude of the branch mn during the $t^{th}$ period in the $c^{th}$ scenario; s(n) is a set of branch initial nodes with a node n as a terminal node; $P_{t,kn,c}$ and $Q_{t,kn,c}$ are an active power and a reactive power transmitted on a branch kn during the $t^{th}$ period in the $c^{th}$ scenario, respectively; $P_{t,n,c}$ and $Q_{t,n,c}$ are an active power and a reactive power injected at the node n during the $t^{th}$ period in the $c^{th}$ scenario, respectively; $P_{t,n,c}^{Sub}$ and $Q_{t,n,c}^{Sub}$ are an active power and a reactive power injected at the node n into a substation during the $t^{th}$ period in the $c^{th}$ scenario; $P_{t,n,c}^{PV}$ and $P_{t,n,c}^{WT}$ are actual powers of photovoltaic power generation and wind power generation connected to a power grid at the node n during the $t^{th}$ period in the $c^{th}$ scenario; $P_{t,n,c}^{LR}$ and $Q_{t,n,c}^{LR}$ are an active power and a reactive power of load reduction at the node n during the $t^{th}$ period in the $c^{th}$ scenario; $P_{t,n,c}^{load}$ and $Q_{t,n,c}^{load}$ are an active power and a reactive power of load injected at the node n during the $t^{th}$ period in the $c^{th}$ scenario; M is a penalty factor of a big M method; $\alpha_{t,mn,c}$ is a state variable of a switch on the branch mn during the $t^{th}$ period in the $c^{th}$ scenario, $\alpha_{t,mn,c}=1$ represents that the switch is closed, and $\alpha_{t,mn,c}=0$ represents that the switch is open; $\tilde{U}_{t,n,c}$ and $\tilde{U}_{t,m,c}$ are squares of voltage amplitudes of nodes m and n during the $t^{th}$ period in the $c^{th}$ scenario, respectively; $\varphi_{sw}$ represents a set of switching branches in an optimization area; and $\varphi_b$ is a set of all branches with tie lines in a power distribution system;

expressions of the radial and connectivity constraint under network reconfiguration being:

$$N^{always} + \sum_{mn \in E^{OA}} \alpha_{mn,c} = N - N^{sub}$$

$$\sum_{k \in f(n)} P_{nk,c}^* - \sum_{k \in s(n)} P_{mn,c}^* = P_{n,c}^* = \rho$$

$$-\alpha_{mn,c} P_{mn,max} \leq P_{mn,c}^* \leq \alpha_{mn,c} P_{mn,max}, \forall mn \in \varphi_{sw}$$

$$-P_{mn,max} \leq P_{mn,c}^* \leq P_{mn,max}, \forall mn \in \varphi_b/\varphi_{sw}$$

where, $N^{always}$ is the total number of non-adjustable branches that are always in a closed state; mn is a branch; $E^{OA}$ is a set of switching branches in an optimization area; $\alpha_{mn,c}$ represents a state variable of a switch on the branch mn in a $c^{th}$ scenario; N is the total number of nodes; $N^{sub}$ is the number of substations for power injection; $P_{n,k,c}^*$ is an active power of auxiliary power flow on an nk branch in a scenario c; $P_{mn,c}^*$ is an active power of auxiliary power flow on the branch mn in the scenario c; $P_{n,c}^*$ is an active power of auxiliary power flow injected at a node n in the scenario c; p is a power injected at the node; and $P_{mn,max}$ represents a maximum value of the active power transmitted by the branch mn;

expressions of the switch constraint being:

$$\begin{cases} \alpha_{mn,t,c}^{Close} + \alpha_{mn,t,c}^{Open} \leq 1, mn \in E^{OA} \\ \alpha_{mn,t,c} + \alpha_{mn,t-1,c} = \alpha_{mn,t,c}^{Close} - \alpha_{mn,t,c}^{Open} \end{cases}$$

$$\begin{cases} \sum_{t=1}^{T} |\alpha_{mn,t,c} - \alpha_{mn,t-1,c}| \leq X_{l,max}, mn \in \varphi_b \\ \sum_{mn \in \varphi_b} \sum_{t=1}^{T} |\alpha_{mn,t,c} - \alpha_{mn,t-1,c}| \leq X_{max} \end{cases}$$

where $\alpha_{mn,t,c}^{Close}$ and $\alpha_{mn,t,c}^{Open}$ are state quantities of switch closing or opening in a $c^{th}$ scenario, $\alpha_{mn,t,c}^{Close}=1$ represents a closing action of a switch, and $\alpha_{mn,t,c}^{Open}=1$ represents an opening action of the switch; $E^{OA}$ is a set of switching branches in an optimization area; $\alpha_{mn,t,c}$ and $\alpha_{mn,t-1,c}$ are switching states of a branch mn during t and t−1 periods in the $c^{th}$ scenario; $X_{l,max}$ is the maximum number of state operations of a single switch; L is the total number of branches with tie lines; and $X_{max}$ is the maximum number of operations of all switches;

an expression of the node voltage constraint being:

$$U_{m,min} \leq U_{t,m,c} \leq U_{m,max}$$

where $U_{m,min}$ and $U_{m,max}$ are a lower limit and an upper limit of a voltage amplitude of a node m, respectively; and $U_{t,m,c}$ is the voltage amplitude of the node m;

expressions of the branch current constraint being:

$$I_{mn,min} \leq I_{mn,t,c} \leq I_{mn,max}, \forall mn \in \varphi_b/\varphi_{sw}$$

$$\alpha_{mn,t,c} I_{mn,min} \leq I_{mn,t,c} \leq \alpha_{mn,t,c} I_{mn,max}, \forall mn \in \varphi_{sw}$$

where $I_{mn,min}$ and $I_{mn,max}$ are a lower limit and an upper limit of a current amplitude of a branch mn, respectively; and $I_{mn,t,c}$ is the current amplitude of the branch mn;

expressions of the new energy output constraint being:

$$P_{m,t}^{PV,min} \leq P_{m,t,c}^{PV} \leq P_{m,t}^{PV,max}$$

$$P_{m,t}^{WT,min} \leq P_{m,t,c}^{WT} \leq P_{m,t}^{WT,max}$$

where $P_{m,t}^{PV,min}$ and $P_{m,t}^{PV,max}$ are a lower limit and an upper limit of an actual output of photovoltaic power generation, respectively; $P_{m,t}^{WT,min}$ and $P_{m,t}^{WT,max}$ are a lower limit and an upper limit of an actual output of wind power generation, respectively; $P_{m,t,c}^{PV}$ is the actual output of photovoltaic power generation; and $P_{m,t,c}^{WT}$ is the actual output of wind power generation; and an expression of the load loss constraint being:

$$0 \le P_{t,n,c}^{LR} \le \alpha_n^{LR} P_{t,n,c}^{L}$$

where $P_{t,n,c}^{LR}$ is a load loss capacity of a node n; $\alpha_n^{LR}$ is a load loss proportional coefficient of the node n; and $P_{t,n,c}^{L}$ is a load capacity of the node n;

wherein the supply guarantee method further comprises: controlling, by a controller, opening and closing actions of sectional switches and interconnection switches of the PND according to the PND supply guarantee strategy, and issuing, by the controller, compensation to users according to the PND supply guarantee strategy.

2. The supply guarantee method for a PDN considering demand response and dynamic reconfiguration according to claim 1, wherein an expression of the photovoltaic output is:

$$P_{PV} = P_{PV,N} \frac{R_c}{R_{st}} [1 + \eta_K (T_C - T_{PV,st})]$$

where $P_{PV}$ is an actual output of photovoltaic power generation; $P_{PV,N}$ is a rated power of the photovoltaic output; R is current solar radiation illuminance; $R_{st}$ is standard ambient solar radiation illuminance; $\eta_k$ is a photoelectric conversion efficiency; $T_c$ is an actual operation temperature of a photovoltaic panel; and $T_{PV,st}$ is a temperature of the photovoltaic panel under a standard condition.

3. The supply guarantee method for a PDN considering demand response and dynamic reconfiguration according to claim 1, wherein an expression of the wind turbine output is:

$$P_{wind} = 0.5 k A \delta_{wind} \rho_{air} V^3$$

where $P_{wind}$ is a wind turbine output; k is a wind power constant; A is a sweeping area of a wind turbine; $\delta_{wind}$ is a wind power factor; $\rho_{air}$ is an air density; and v is a wind velocity.

4. The supply guarantee method for a PDN considering demand response and dynamic reconfiguration according to claim 1, wherein expressions of the load model are:

$$L_{t,eh} = L_{t,nor} + \Delta L_{t,eh}$$

$$\Delta L_{t,eh} = \beta_1 \Delta H_{t,temp} + \beta_2 \Delta H_{t,humi} + \beta_3 \Delta H_{t,rain} + \varepsilon$$

where $L_{t,eh}$ is a total load at a moment t under abnormal weather; $L_{t,nor}$ is a predicted load value at the moment t under normal weather; $\Delta L_{t,eh}$ is a load increment at the moment t caused by meteorological factors; $\beta_1$, $\beta_2$ and $\beta_3$ represent proportional coefficients of incremental power consumption caused by changes of temperature, humidity and precipitation, respectively; $\Delta H_{t,temp}$, $\Delta H_{t,humi}$ and $\Delta H_{t,rain}$ are the changes of actual temperature, humidity and precipitation under extreme weather, respectively; and $\varepsilon$ is an error term.

5. The supply guarantee method for a PDN considering demand response and dynamic reconfiguration according to claim 1, further comprising:

controlling, by the controller, a wind turbine and a photovoltaic system to output power according to the PDN supply guarantee strategy.

\* \* \* \* \*